(12) United States Patent  (10) Patent No.: US 9,233,701 B2
Glover  (45) Date of Patent: Jan. 12, 2016

(54) FOOT-POWERED SCOOTERS HAVING ENHANCED STABILITY, TURNING AND CONTROL

(71) Applicant: Jeffrey L. Glover, North Plainfield, NJ (US)

(72) Inventor: Jeffrey L. Glover, North Plainfield, NJ (US)

( * ) Notice: Subject to any disclaimer, the term of this patent is extended or adjusted under 35 U.S.C. 154(b) by 0 days.

(21) Appl. No.: 14/106,776

(22) Filed: Dec. 15, 2013

(65) Prior Publication Data

US 2014/0167376 A1 Jun. 19, 2014

Related U.S. Application Data

(60) Provisional application No. 61/737,748, filed on Dec. 15, 2012.

(51) Int. Cl.
*B62M 1/00* (2010.01)
*B62B 3/00* (2006.01)
*B62K 3/00* (2006.01)

(52) U.S. Cl.
CPC .................. *B62B 3/001* (2013.01); *B62K 3/002* (2013.01)

(58) Field of Classification Search
CPC ............. A63C 17/0093; A63C 17/011; A63C 17/012; A63C 17/016
USPC ....................................... 280/87.041, 87.042
See application file for complete search history.

(56) References Cited

U.S. PATENT DOCUMENTS

| | | | | |
|---|---|---|---|---|
| 3,442,528 A * | 5/1969 | Rademacher | ............ | 280/87.041 |
| 4,951,958 A * | 8/1990 | Chao | ........................ | 280/87.041 |
| 5,160,155 A * | 11/1992 | Barachet | ................... | 280/87.042 |
| 5,984,328 A * | 11/1999 | Tipton | ....................... | 280/87.042 |
| 6,102,415 A * | 8/2000 | Stewardson | ............... | 280/87.042 |
| 6,193,249 B1 * | 2/2001 | Buscaglia | ................. | 280/87.042 |
| 6,217,058 B1 * | 4/2001 | Wang et al. | ................ | 280/655.1 |
| 6,311,994 B1 * | 11/2001 | Wang et al. | ............... | 280/87.041 |
| 6,419,249 B1 * | 7/2002 | Chen | ......................... | 280/87.042 |
| 6,428,022 B1 * | 8/2002 | Namiki | ...................... | 280/87.042 |
| 6,494,470 B2 * | 12/2002 | Chang | ........................ | 280/87.041 |
| 6,669,215 B2 * | 12/2003 | Laporte | ...................... | 280/87.042 |
| 6,676,138 B1 * | 1/2004 | Rosso | ........................ | 280/11.221 |
| 6,896,274 B2 * | 5/2005 | Leslie | ........................ | 280/87.042 |
| 7,249,774 B1 * | 7/2007 | Tyler | .......................... | 280/87.041 |
| 7,255,356 B2 * | 8/2007 | Lin | ............................. | 280/87.041 |
| 8,414,000 B2 * | 4/2013 | Chen et al. | ................ | 280/87.042 |
| 8,469,376 B2 * | 6/2013 | Kristiansen | .............. | 280/87.042 |
| 8,632,083 B2 * | 1/2014 | Lovley et al. | ............. | 280/87.041 |
| 2003/0122334 A1 * | 7/2003 | Laporte | ...................... | 280/87.041 |
| 2005/0206108 A1 * | 9/2005 | Chung | .......................... | 280/87.1 |
| 2005/0230930 A1 * | 10/2005 | Chung | ....................... | 280/87.041 |
| 2007/0205569 A1 * | 9/2007 | Battocchio | ................ | 280/11.224 |
| 2008/0179849 A1 * | 7/2008 | Fan | ............................ | 280/87.041 |
| 2011/0089656 A1 * | 4/2011 | Chiu et al. | ................. | 280/87.041 |
| 2013/0001909 A1 * | 1/2013 | Stillinger et al. | ......... | 280/87.041 |
| 2013/0307240 A1 * | 11/2013 | Petutschnig | ............. | 280/87.042 |
| 2014/0167376 A1 * | 6/2014 | Glover | ...................... | 280/87.041 |

* cited by examiner

*Primary Examiner* — Jeffrey J Restifo
(74) *Attorney, Agent, or Firm* — Doherty IP Law Group LLC

(57) ABSTRACT

A scooter includes a frame having a leading end adjacent the front of the scooter and a trailing end adjacent the rear of the scooter, a front wheel mounted adjacent the leading end of the frame, and a rear wheel mounted adjacent the trailing end of the frame. The front wheel is pivotally mounted to a front head set of the scooter frame so as to enable the front wheel to pivot relative to the front head set. The front head set has a longitudinal axis that angles inwardly toward the rear of the scooter so that a lower end of the front head set is closer to the rear of the scooter than an upper end of the front head set. The rear end of the scooter frame has a rear head set that extends along a longitudinal axis that is angled inwardly toward the front of the scooter so that a lower end of the rear head set is closer to the front of the scooter than an upper end of the rear head set.

17 Claims, 7 Drawing Sheets

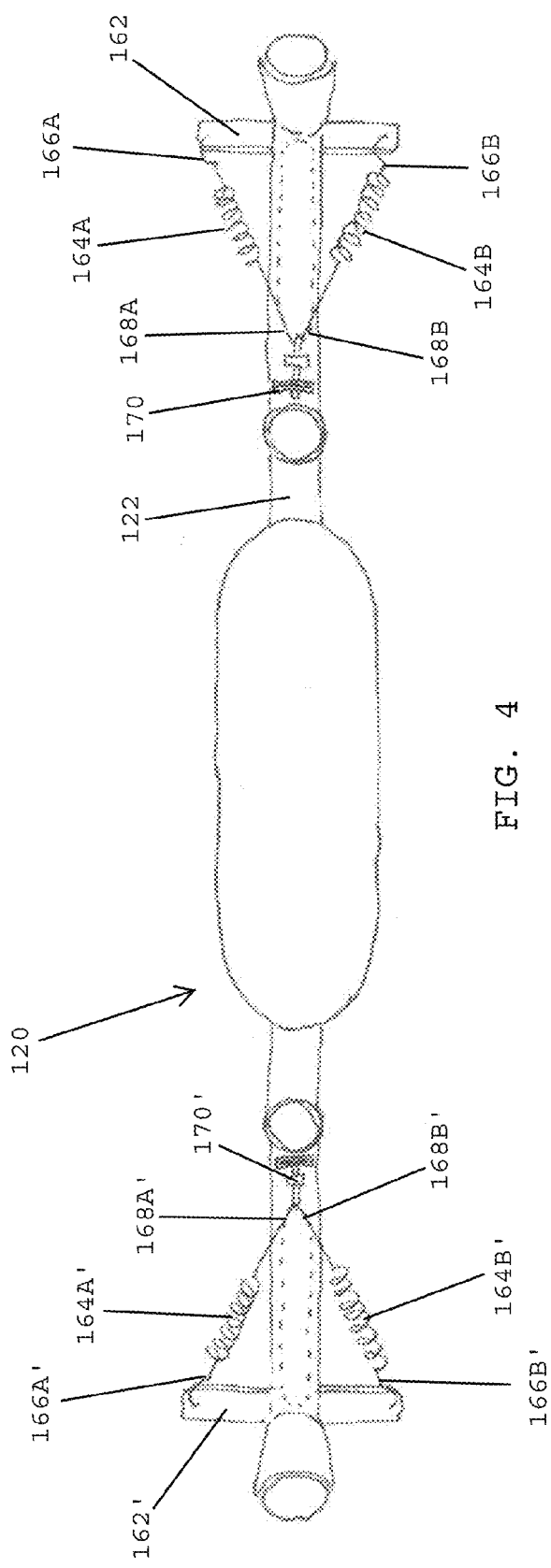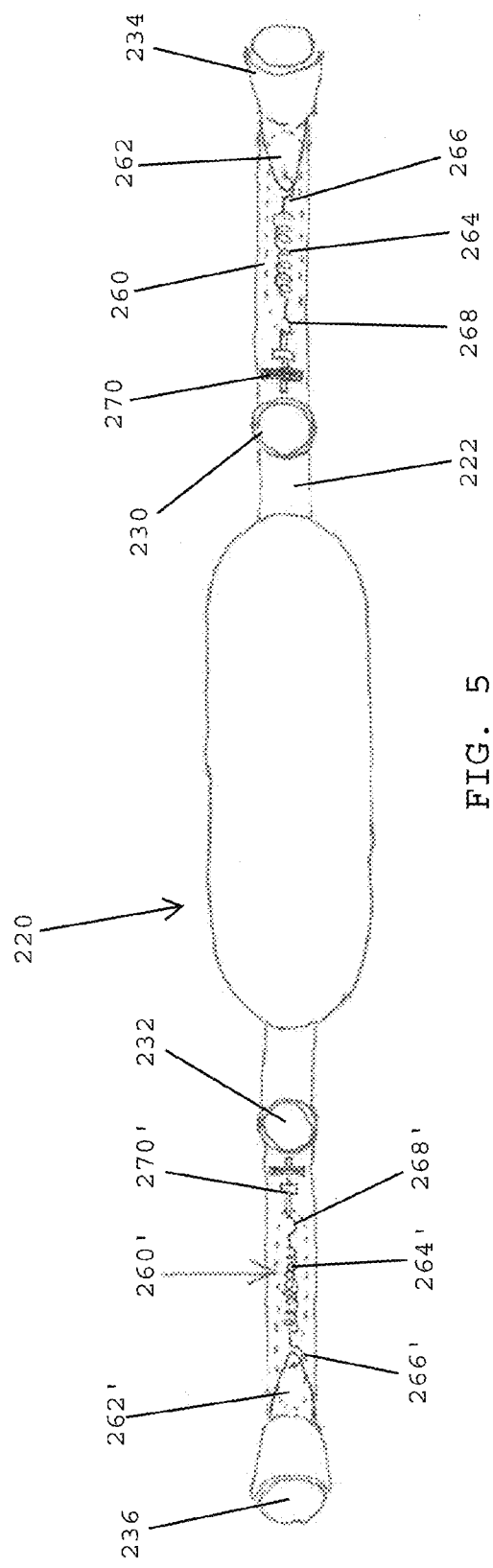
FIG. 4
FIG. 5

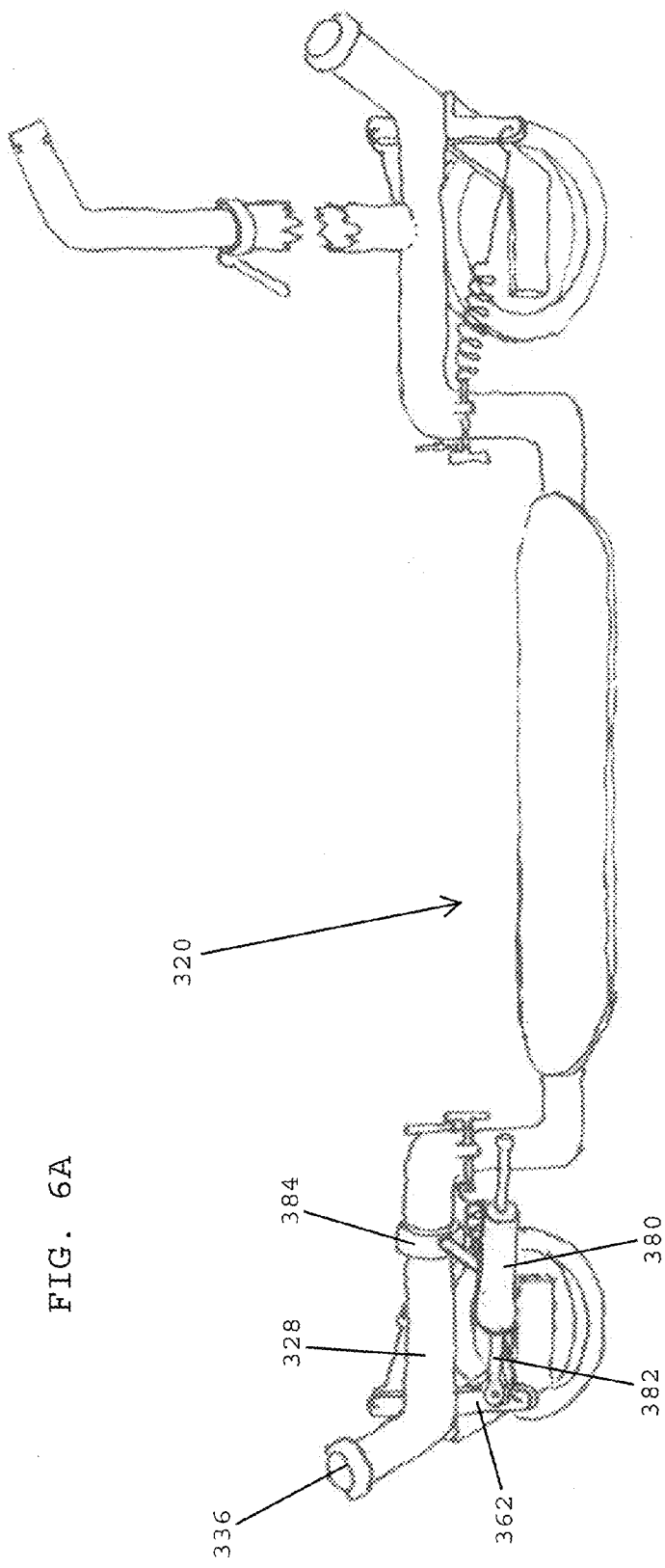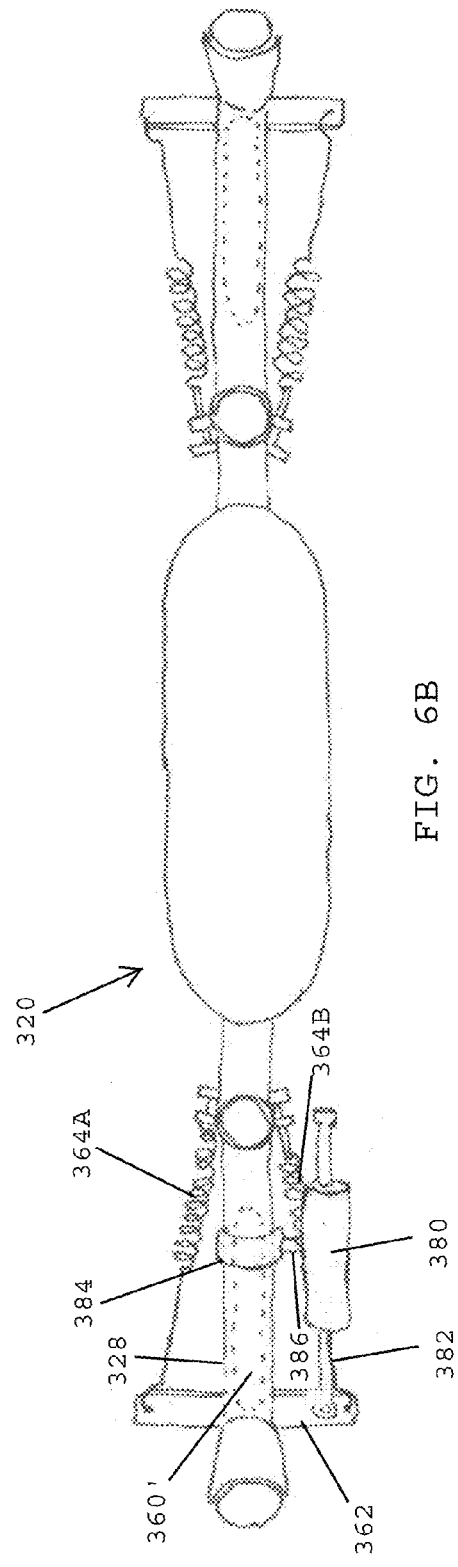
FIG. 6A
FIG. 6B

FOOT-POWERED SCOOTERS HAVING ENHANCED STABILITY, TURNING AND CONTROL

CROSS REFERENCE TO RELATED APPLICATIONS

The present application claims benefit of U.S. Provisional Application No. 61/737,748, filed Dec. 15, 2012, the disclosure of which is hereby incorporated by reference herein.

BACKGROUND OF THE INVENTION

1. Field of the Invention

The present application is generally related to vehicles having wheels, and is more specifically related to foot-powered scooters.

2. Description of the Related Art

There is a need for an environmentally friendly, individual means of transportation that is sufficiently compact and easy to transport and store. In many instances, a bicycle is not an adequate solution due to its size, weight, and complex structure.

One alternative to a bicycle for personal transportation is a foot powered scooter having a front wheel and a rear wheel, and a foot platform whereby one foot is placed on the foot platform and the other foot is used to push the scooter forward. The elimination of pedals, gears, and chains makes the scooter significantly lighter and less expensive than a bicycle.

One problem with conventional scooters is that two hands are required to steer. In addition, conventional scooters perform all of the turning function through the front wheel, which reduces the level of stability and control.

Thus, there is a need for a new and improved foot powered scooter that can be steered using only one hand, and whose turning function is performed by both the front and rear wheels working in harmony with one another. There also remains a need for a foot powered scooter that provides enhanced stability, that is easier to turn, and that provides "carving" action found in conventional skateboards.

SUMMARY OF THE INVENTION

In one embodiment, a scooter includes a frame having a leading end adjacent the front of the scooter and a trailing end adjacent the rear of the scooter. In one embodiment, the scooter has a front wheel mounted adjacent the leading end of the frame and a rear wheel mounted adjacent the trailing end of the frame. The front wheel is pivotally mounted to a front head set of the scooter frame that enables the front wheel to pivot relative to the front head set. The front head set has a longitudinal axis that angles inwardly toward the rear of the scooter so that the lower end of the front head set is closer to the rear of the scooter than the upper end of the front head set. In one embodiment, the front wheel is mounted to the lower end of the front head set via a front fork. The front fork includes a series of mounting holes that enable the front wheel to be mounted on the front fork at different offset distances relative to the longitudinal axis of the front head set for modifying the performance of the front wheel. In one embodiment, when the scooter is placed atop a road surface, the longitudinal axis of the front head set intersects the road surface at a first point, and a vertical axis drawn through the center of the front wheel mounted on the front fork intersects the road surface at a second point, whereby the second point is closer to the rear of the scooter than the first point. The horizontal distance between the first point and the second point is preferably defined as the front wheel offset distance for the front wheel.

The rear end of the scooter frame includes a rear head set that extends along a longitudinal axis that is angled inwardly toward the front of the scooter so that the lower end of the rear head set is closer to the front of the scooter than the upper end of the rear head set. In one embodiment, the rear wheel is mounted on a rear fork, which, in turn, is pivotally connected to the lower end of the rear head set. The rear fork has a series of openings that enable the rear wheel to be secured to the rear fork at different offset distances relative to the longitudinal axis of the rear head set for modifying the performance of the rear wheel. In one embodiment, when the scooter is placed atop a road surface, the longitudinal axis of the rear head set intersects the road surface at a third point, and a vertical axis drawn through the center of the rear wheel mounted on the rear fork intersects the road surface at a fourth point, whereby the third point is closer to the rear of the scooter than the fourth point. The horizontal distance between the third point and the fourth point is preferably defined as the rear wheel offset distance for the rear wheel.

In one embodiment, the front and rear wheels are attached to the respective front and rear head sets using a castor-like assembly. The castor-like assembly for the front wheel includes the front fork, which is normally oriented to extend toward the rear end of the scooter and the castor-like assembly for the rear wheel includes the rear fork that is normally oriented toward the leading end of the scooter.

In one embodiment, each of the front and rear wheels is adapted to pivot and/or rotate independently of one another. In one embodiment, the front wheel is coupled with one or more elastic elements such as one or more springs that normally urge the front wheel to return to a center position (e.g., when the scooter travels in a straight path). If the front wheel pivots to the left or the right, at least one of the springs coupled with the front wheel is stretched for storing potential energy therein. When the pivoting forces are no longer applied to the front wheel, the at least one spring pulls the front wheel back to the center position. The rear wheel has a similar arrangement whereby at least one elastic element, such as a spring, normally urges the rear wheel to return to a center position (e.g., when the scooter is travelling on a straight path).

In one embodiment, the elastic elements may include elastic, resilient, and/or rubber bands that are coupled to the wheels for normally urging the wheels back to a center position. In one embodiment, the elastic elements may include a rod that is affixed to a fork (e.g., rigidly affixed), whereby the rod is encased inside a rubber "cork" that is affixed (e.g., rigidly affixed) to the frame. In one embodiment, potential energy is built up in the elastic element when a wheel is turned to the left or right, and the stored potential energy returns the wheel to a center position at the end of a turn. It is contemplated that a wide variety or elastic or resilient elements may be utilized, whereby energy is stored in the elastic or resilient elements when the wheels are turned and the stored energy pulls or urges the wheels back into a center position at the end of a turn.

In one embodiment, the frame includes a horizontally extending front section, a horizontally extending mid-section, and a horizontally extending rear section. A front vertical section extends between the trailing end of the horizontally extending front section and the leading end of the horizontally extending mid-section, and a second vertical section extends between the trailing end of the horizontally extending mid-section and the leading end of the horizontally extending rear section. The horizontally extending mid-section, upon whose surface the rider stands, preferably lies within a plane that is below the front and rear frame sections and that is at or below a plane extending through the centers of the front and rear wheels. Although the present invention is not limited by any particular theory of operation, it is believed that providing a horizontally extending mid-section that is lower than the other parts of the frame and below the centers of the front and rear wheels will enhance the stability of the scooter, and make it easier for a rider to turn the scooter to the left and right.

In one embodiment, the scooter includes a rudder having a handle that is connected to the horizontally extending front section adjacent the front wheel. In one embodiment, the wheels turn independently of the rudder, and the rudder is not directly connected to the wheels for turning the wheels to the left or right. In one embodiment, the handle is pivotally secured to the upper end of the rudder so that the angle of the handle relative to the rudder may be adjusted and locked in place using a handle locking assembly. In one embodiment, the height of the rudder and the distance between the handle and the horizontally extending front section of the frame may be adjusted. When an operator has achieved a desired height for the rudder, the operator may use a rudder locking assembly for fixing the height of the rudder.

In one embodiment, the scooter includes a foot platform that is secured atop the horizontally extending mid-section of the frame. The foot platform may have a substantially flat top surface or may have a convex surface that has sides that curve down toward the ground.

In one embodiment, the scooter includes a steering damper assembly that is coupled with the rear wheel to prevent the rear wheel from kicking out or pivoting violently when striking an object such as a rock or pebble. One end of the damper assembly is preferably coupled to the frame of the scooter proximal to the rear wheel, while the other end of the damper assembly is coupled with the fork. The steering damper assembly is particularly useful because the castor-like assembly of the rear wheel orients the rear wheel to normally face toward the leading end of the scooter. The steering damper assembly allows normal turning of the rear wheel to the left and right, however, the damper assembly prevents excessively fast or violent pivoting of the rear wheel, such as when the rear wheel strikes an object.

In one embodiment, the frame is made from durable materials such as metal, such as steel. The foot platform may be made of durable materials such as metal, wood or plastic. The front and rear wheels are preferably made of a hard material such as polyurethane having road engaging surfaces that are convexly curved. The convexly curved road engaging surfaces provide peaks or apexes that enable the scooter wheels to more easily lean to the left or right when turning the scooter.

These and other preferred embodiments of the present invention will be described in more detail below.

BRIEF DESCRIPTION OF THE DRAWING

FIG. 4 shows a top plan view of a scooter, in accordance with another embodiment of the present invention.

FIG. 5 shows a top plan view of a scooter, in accordance with yet another embodiment of the present invention.

FIG. 6A shows a perspective view of a scooter having a steering damper assembly coupled with a rear wheel, in accordance with one embodiment of the present invention.

FIG. 6B shows a top plan view of the scooter and the steering damper assembly of FIG. 6A.

DETAILED DESCRIPTION

Figure 1A:
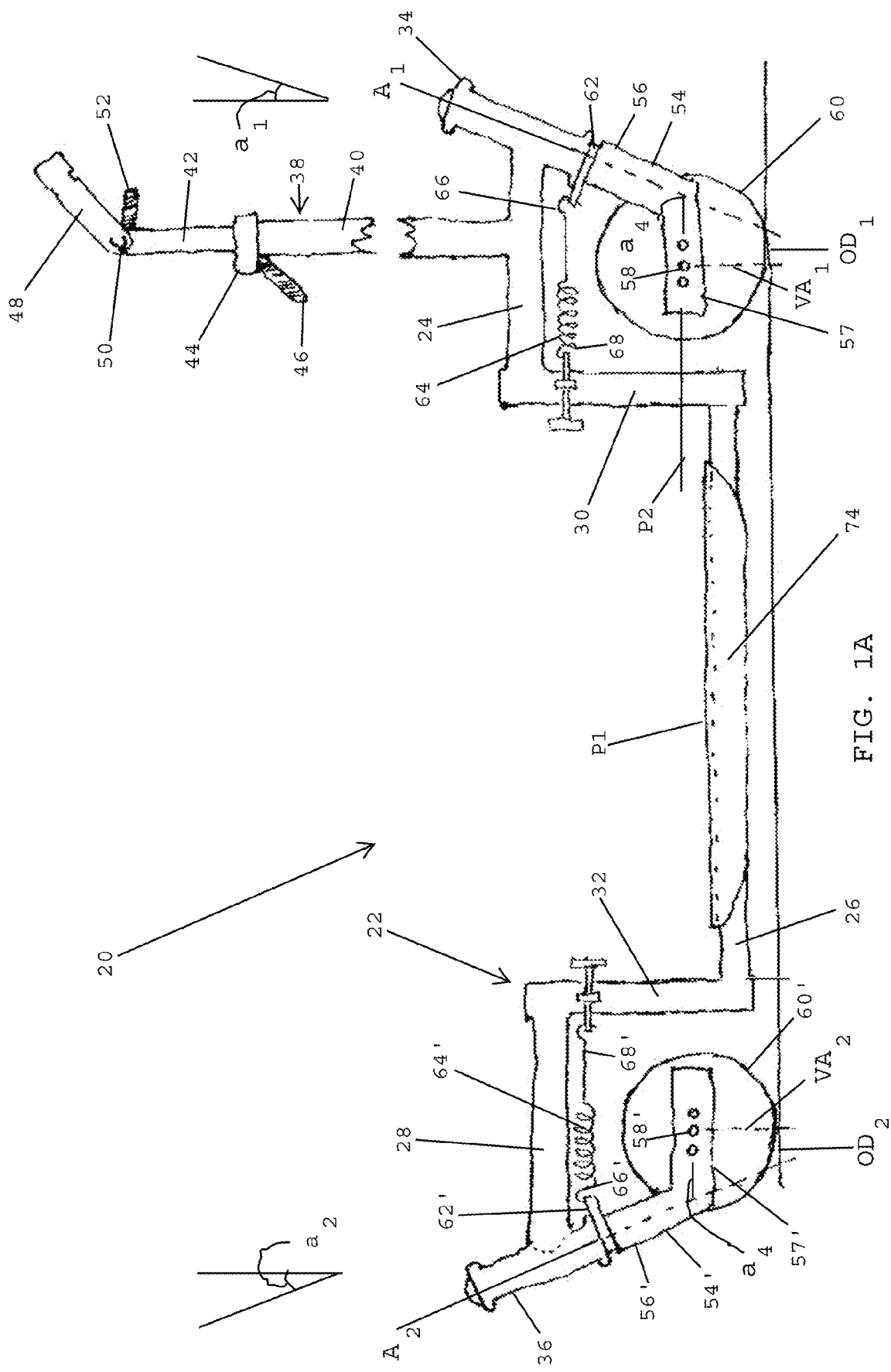
FIG. 1A shows a side elevation view of a scooter, in accordance with one embodiment of the present invention.
Figure 1B:
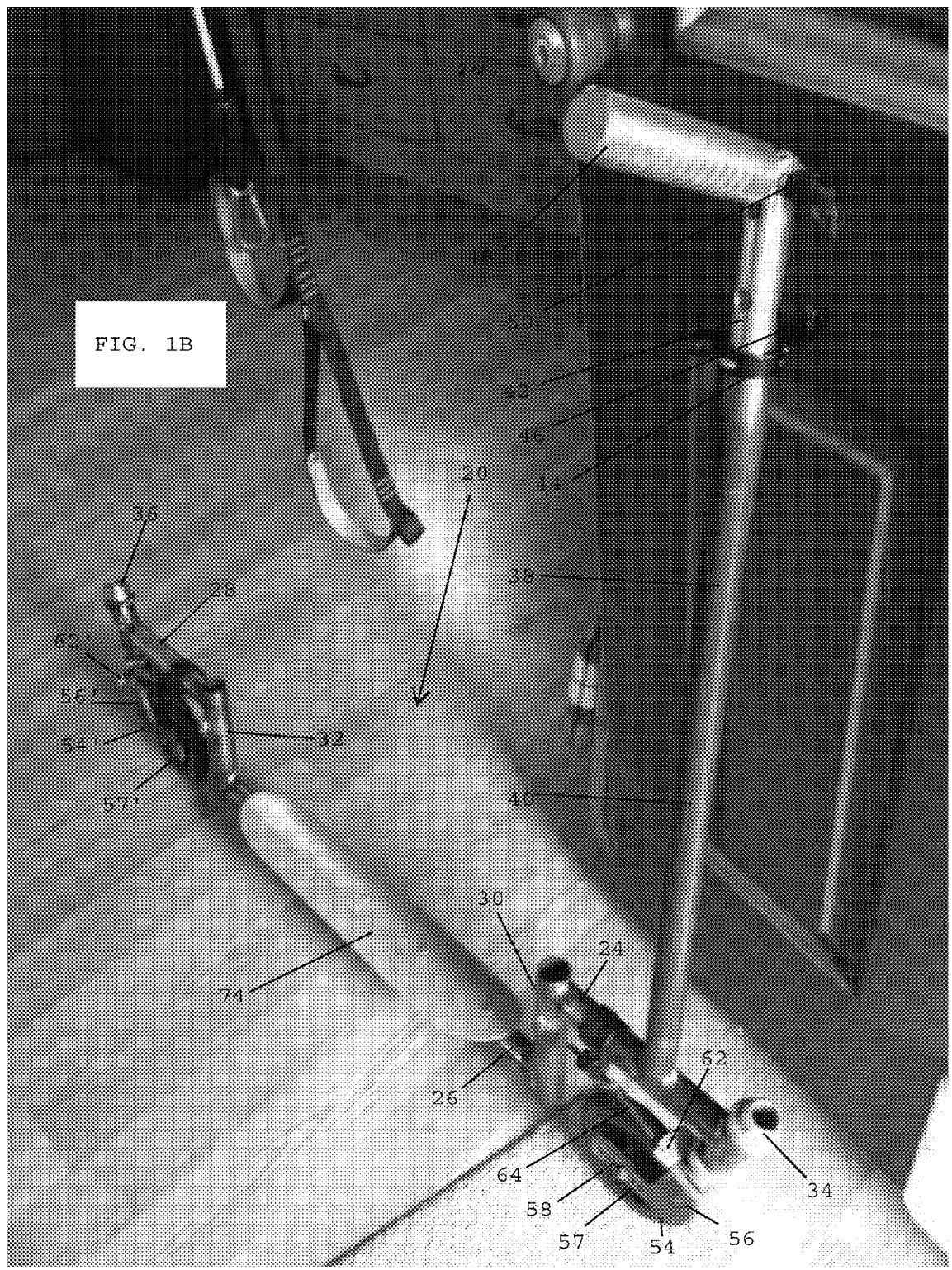
FIG. 1B shows a perspective view of the scooter shown in FIG. 1A.

Referring to FIGS. 1A and 1B, in one embodiment, a scooter 20 includes a frame 22 having a horizontally extending front section 24, a horizontally extending mid-section 26 and a horizontally extending rear section 28. The horizontally extending front section 24, the horizontally extending mid-section 26, and the horizontally extending rear section 28 may extend parallel to one another and parallel to the ground. The frame 22 also desirably includes a front vertical section 30 that extends between a trailing end of the horizontally extending front section 24 and the leading end of the horizontally extending mid-section 26. The frame 22 also desirably includes a rear vertical section 32 that extends between the trailing end of the horizontally extending mid-section 26 and the leading end of the rear frame section 28. The horizontally extending mid-section 26 of the frame extends within a plane P1 that is below the plane that defines the top and rear sections 24, 28 of the frame 22.

The scooter frame 22 also desirably includes a front head set 34 that is connected to the leading end of the horizontally extending front section 24, and a rear head set 36 that is connected with a trailing end of the rear horizontally extending second section 28. The front head set 34 and the front vertical section 30 define an angle $\alpha_1$ of about 20-45° and more preferably about 30-45°. The rear head set 36 and the rear vertical section 32 define an angle $\alpha_2$ of about 20-45° and more preferably about 30-45°. In one embodiment, the front and rear headsets 34, 36 are preferably angled inwardly toward one another for enhancing the stability of the scooter and improving turning of the scooter, as will be described in more detail herein.

In one embodiment, the scooter 20 preferably includes a rudder 38 that extends upwardly from the first horizontally extending section 24 of the frame 22. The rudder 38 has a lower part 40 having a lower end connected with the horizontally extending front section 24 of the frame 22, and an upper part 42 that is telescopically received within the lower part 40. The rudder 38 includes a vertical height adjustment assembly 44 having a locking lever 46 that locks the upper part 42 of the rudder relative to the lower part 40 of the rudder. The upper part 42 is designed to slide up and down relative to the lower part 40 of the rudder for adjusting the vertical height of the rudder 38. When a desired vertical height is attained, the locking lever 46 may be placed in a locked position for locking the upper part 42 of the rudder from further vertical movement relative to the lower part 40. The rudder 38 also desirable includes a handle 48 that is pivotally connected with the upper end of the upper part 42 via pivot pin 50. The rudder 38 includes a second locking lever 52 that is designed to lock the handle 48 in a certain angled position relative to the upper end of the upper part 42 of the rudder.

In one embodiment, the rudder 38 is fixed to the frame 22 of the scooter 20. In one embodiment, the rudder 38 is not directly connected to the wheels for pivoting or turning the wheels for turning the scooter. In one embodiment, the rudder 38 is grasped by an operator (e.g., grasped with one hand) and is used by the operator for leaning the scooter to the left or right for turning the scooter to the left or the right.

In one embodiment, the scooter 20 includes a front fork 54 having an upper end that is pivotally coupled with a lower end of the front head set 34. The front fork may be used to make a castor-like connection between the front wheel and the lower end of the front head set. The front fork 54 includes a first part 56 that extends along the longitudinal axis $A_1$ of the front head set 34. As such, the first part 56 of the front fork is angled relative to the front vertical section 30 of the scooter frame 22. The front fork 54 includes a second part 57 that defines an obtuse angle with the first part 56 designated angle $\alpha_4$ of about 100-135°. The second part 56 of the front fork 54 has a series of mounting holes 58 that are adapted to receive a shaft of a front wheel 60 so that the front wheel may be rotatably secured to the front fork. The mounting holes 58 extend along a horizontal axis that is parallel to the plane P1 of the mid-section 26. The mounting holes 58 enable the front wheel to be mounted at different positions for altering an offset distance $OD_1$ between the longitudinal axis $A_1$ of the front head set 34 and a vertical axis $VA_1$ extending through the center of the front wheel 60. The offset distance may be modified as desired by a user for changing the stability and ride control characteristics of the scooter.

In one embodiment, the scooter 20 preferably includes a rear fork 54' having a first section 56' that is pivotally coupled with a lower end of the rear head set 36. The rear fork 54' includes a first part 56' that extends along the longitudinal axis $A_2$ of the longitudinal axis of the rear head set 36. The rear fork 54' includes a second part 57' that defines an obtuse angle designated $\alpha_4$ with the first part 56' of about 100-135°. The second part 57' of the fork 54' has a series of mounting holes 58' that are adapted to receive a center shaft of the rear wheel 60'. The mounting holes 58' enable the rear wheel 60' to be mounted at different positions for altering an offset distance $OD_2$ between the longitudinal axis $A_2$ of the rear head set 36 and a vertical axis $VA_2$ extending through the center of the rear wheel 60' for changing the ride characteristics of the scooter.

In one embodiment, the scooter 20 includes a front cross piece 62 that is connected with the front fork 54 and that pivots simultaneously with the front fork 54. The front cross piece 62 and the front fork 54 pivot together, relative to the front head set 34. The scooter 20 includes at least one front wheel spring 64 having a leading end 66 that is connected with the front cross piece 62 and a trailing end 68 that is connected with the frame 22. The scooter 20 includes a rear cross piece 62' that is connected with the rear fork 54' and that pivots simultaneously with the rear fork 54'. The rear cross piece 62' and the rear fork 54' pivot together, relative to the rear head set 36. The scooter 20 includes at least one second spring 64' having a first end 66' connected with the rear cross piece 62' and a second end 68' connected with the rear vertical section 32 of the frame 22.

The at least one front wheel spring 64 provides a constant spring force on the front cross piece 62 and the front fork 54 that normally urges the front wheel 60 to return to a center position. If the front wheel 60 rotates to the left or to the right from the center position, the spring 64 urges the front wheel 60 to return to the center position. The at least one rear wheel spring 64' performs a similar function for the rear wheel 60' and normally urges the rear wheel 60' to return to a center position. If the rear wheel 60' turns to the left or the right, the rear wheel spring 64' preferably provides a spring force that urges the rear wheel 60' to return to the center position.

The scooter 20 also desirably includes a foot platform 74 that is mounted atop the horizontally extending mid-section 26 of the frame 22. The foot platform 74 may have a substantially flat surface or may have a convexly-cured top surface having curved side edges that extend downwardly toward the ground. The foot platform 74 may be made of metal, wood, or polymer materials. In one embodiment, the foot platform 74 extends along a first plane P1 that is at or below a second plane P2 that extends through the centers of the respective front and rear wheels 60, 60'. As a result, the foot platform 74 is closer to the ground than the centers of the front and rear wheels 60, 60', which enhances the stability and turning ability of the scooter 20.

Figure 2:
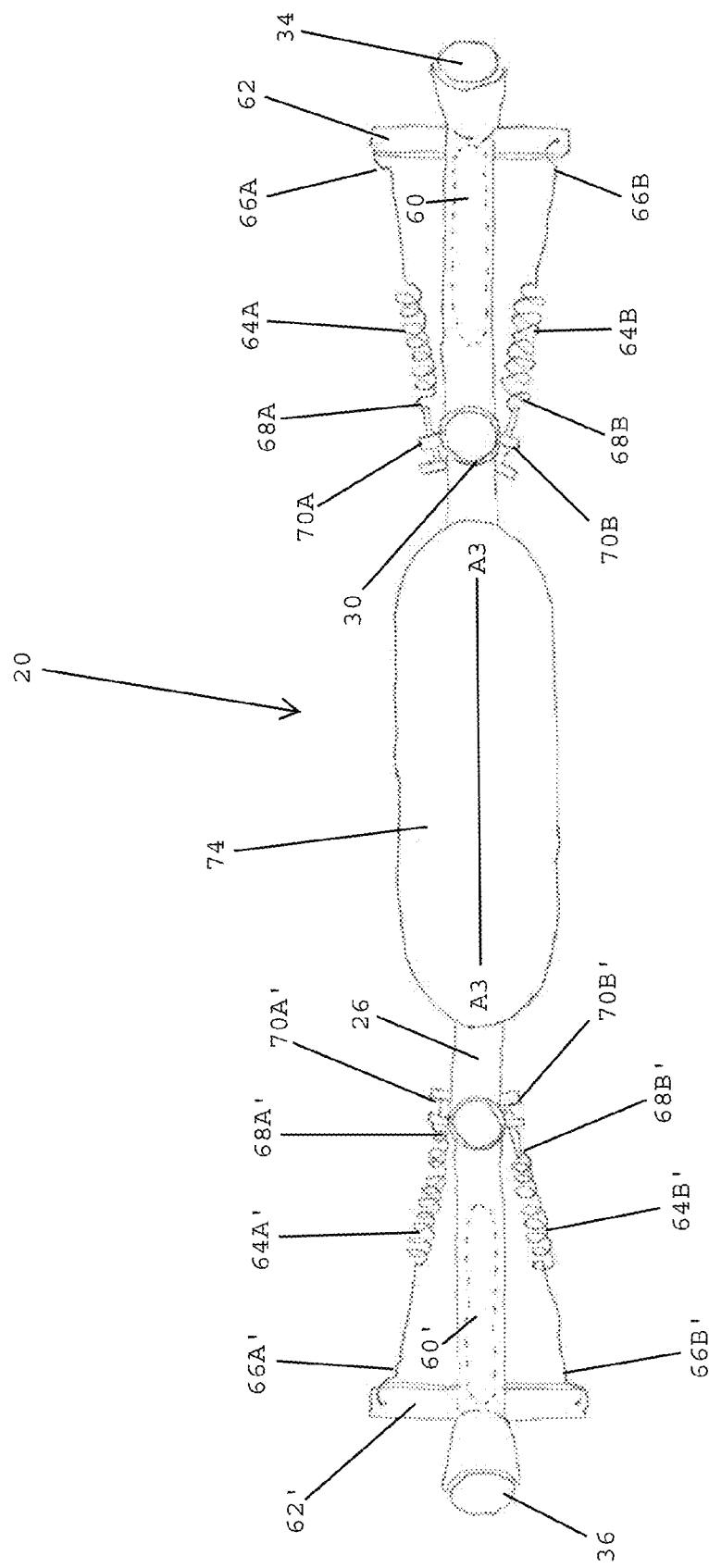
FIG. 2 shows a top plan view of the scooter shown in FIG. 1A.

Referring to FIG. 2, in one embodiment, the scooter 20 includes the front head set 34 having the front cross piece 62 pivotally connected thereto. The front cross piece 62 is connected with the front wheel 60 via the front fork 54 (FIG. 1A). The front cross piece and the front fork pivot together simultaneously, and the front cross piece and the front fork pivot together relative to the front head set. The scooter 20 desirably includes a first front wheel spring 64A having a leading end 66A connected with the front cross piece 62 and a rear end 68A connected with a first spring mounting flange 70A attached to a first side of the front vertical section 30 of the scooter frame. The scooter 20 includes second front wheel spring 64B having a leading end 66B connected with the front cross piece 62 and a trailing end 68B connected with a second spring mounting flange 70B attached to a second side of the front vertical section 30 of the scooter frame. In one embodiment, the leading ends of the respective springs 64A, 64B are attached to opposite ends of the front cross piece 62. In FIG. 2, the front wheel 60 is centered in a neutral position so that it extends along the longitudinal axis $A_3$ of the scooter 20. If the front wheel 60 turns to the left or the right from the center position shown in FIG. 2, one of the front wheel springs 64A, 64B is stretched and the energy stored in the stretched spring urges the front wheel 60 to return to the center position when the scooter is upright.

In one embodiment, the scooter 20 includes the rear head set 36 having the rear cross piece 62' pivotally connected therewith. The rear cross piece 62' includes the rear fork 54' (FIG. 1A) attached therewith for pivoting simultaneously with the rear cross piece 62', and relative to the rear head set 36. The lower end 57' (FIG. 1A) of the rear fork 54' is connected with the rear wheel 60'. The scooter 20 includes a pair of rear wheel springs 64A', 64B' that normally urge the rear wheel 60' into a center position shown in FIG. 2. The rear wheel springs include a first rear spring 64A' having a rear end 66A' connected with the rear cross piece 62' and a leading end 68A' connected with a first rear spring mounting flange 70A'. The pair of rear springs includes a second rear wheel spring 64B' having a trailing end 66B' connected with the rear cross piece 62' and a leading end 68B' connected with a second rear spring mounting flange 70B'. The first and second rear wheel springs 64A, 64B' preferably urge the rear wheel 60' into the center position shown in FIG. 2 when the scooter is returned to an upright position. If the rear wheel 60' pivots to the left or to the right from the center position shown in FIG. 2, at least one of the first and second rear wheel springs 64A', 64B' is stretched, and the energy stored in the stretched rear wheel spring urges the rear wheel 60' to pivot back to the center position.

The scooter 20 desirably includes the foot platform 74 that is mounted atop the horizontally extending mid-section 26 of the frame of the scooter. The foot platform 74 preferably extends along the longitudinal axis $A_3$ of the scooter 20.

Figure 3A:
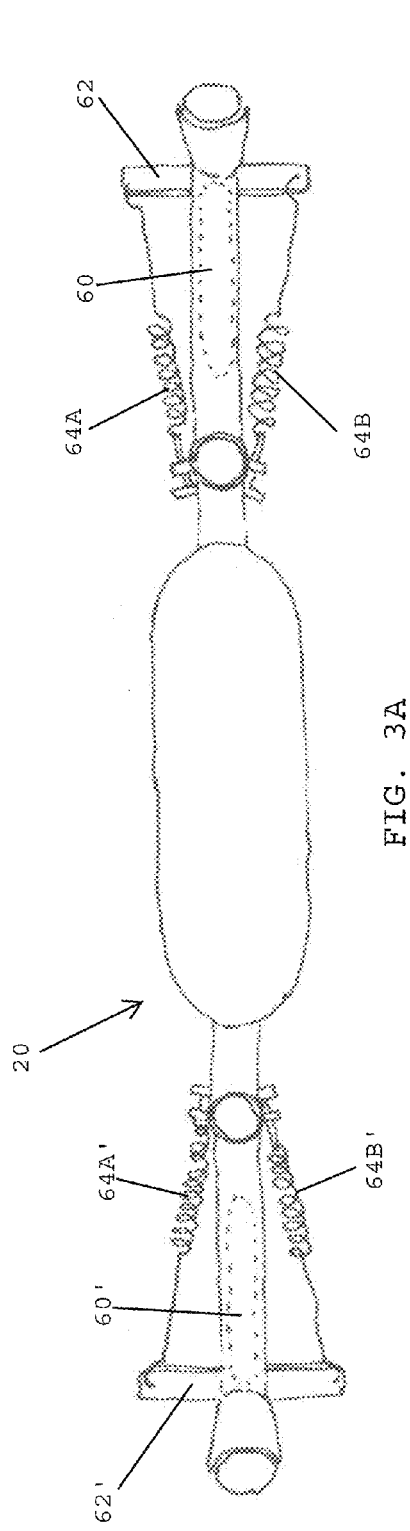
FIG. 3A shows the scooter of FIGS. 1A and 2 when the scooter is moving forward along a straight path.

Referring to FIG. 3A, in one embodiment, the scooter 20 includes the front wheel 60 at the front of the scooter and the rear wheel 60' at the rear of the scooter. In FIG. 3A, the scooter 20 is upright for proceeding along a straight path toward the right side of the page and is not leaning to the left or the right. In the riding stage shown in FIG. 3A, no turning forces are applied to the front and rear wheels 60, 60'. The scooter 20 includes the front wheel springs 64A, 64B connected with the front cross piece 62 for urging the front wheel 60 into a center position. The first and second rear wheel springs 64A', 64B' are connected with the rear cross piece 62' for urging the rear wheel 60' in a center position.

Figure 3B:
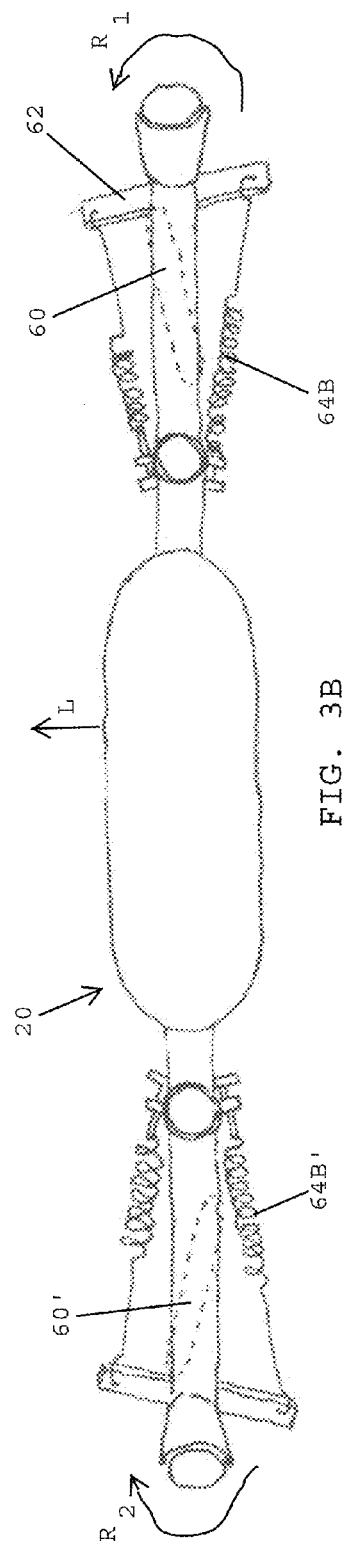
FIG. 3B shows the scooter of FIGS. 1A and 2 when the scooter is moving forward and leaned to the left for turning left.

Referring to FIG. 3B, in one embodiment, as the scooter 20 moves forward toward the right side of the page, the scooter is leaned to the left in the direction L for pivoting the front wheel 60 in a counter clockwise direction $R_1$ and the rear wheel 60' in a clockwise direction $R_2$. With the front and rear wheels 60, 60' pivoted into the positions shown in FIG. 3B, the scooter 20 turns to the left as it rolls forward toward the right side of the page. As the front wheel 60 pivots in a counter clockwise direction $R_1$, the second front wheel spring 64B is stretched for storing potential energy therein. At the same time, the rear wheel 60' pivots in the clockwise direction $R_2$, whereupon the second rear wheel spring 64B' is stretched for storing potential energy therein. As the scooter 20 returns to the upright position shown in FIG. 3A for traveling along a straight path, the second front wheel spring 64B pulls the front cross piece 62 and the front wheel 60 in a clockwise direction for returning the front wheel to the center position shown in FIG. 3A, and the second rear wheel spring 64B' pulls the rear cross piece 62' and the rear wheel 60' in a counter-clockwise direction for returning the rear wheel 60' to the center position shown in FIG. 3A.

Figure 3C:
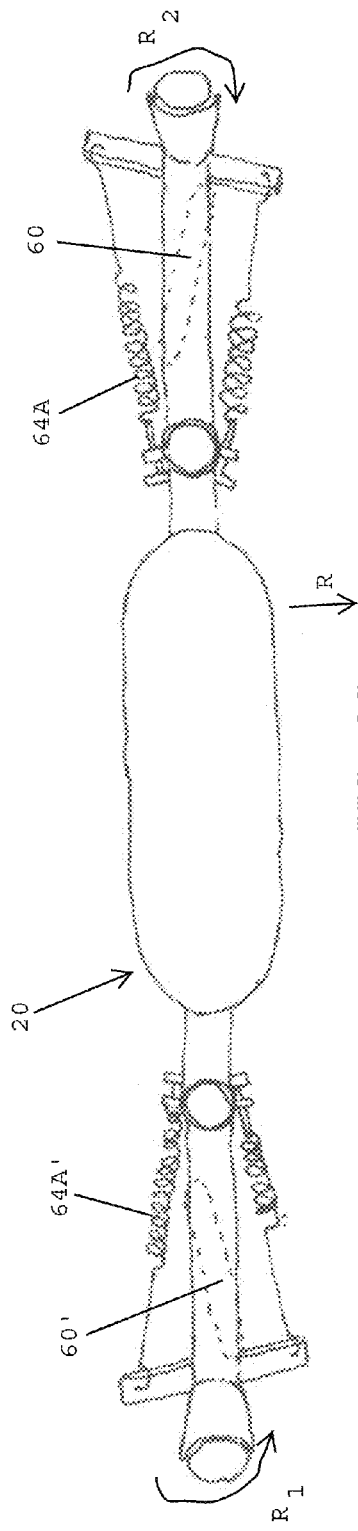
FIG. 3C shows the scooter of FIGS. 1A and 2 when the scooter is moving forward and leaned to the right for turning right.

Referring to FIG. 3C, in one embodiment, as the scooter 20 is leaned to the right in the direction R, the front wheel 60 is pivoted in a clockwise direction $R_2$ and the rear wheel 60' is pivoted in a counter-clockwise direction $R_1$. As the front wheel 60 pivots in a clockwise direction $R_2$, the first front wheel spring 64A is stretched for storing potential energy in the first front wheel spring 64A. As the rear wheel 60' is pivoted in the counter-clockwise direction $R_1$, the first rear wheel spring 64A' is stretched for storing potential energy therein. As the scooter 20 is returned to the upright position shown in FIG. 3A, the first front wheel spring 64A desirably pulls the front wheel 60 in a counter clockwise direction for returning the front wheel 60 to the center position shown in FIG. 3A, and the first rear wheel spring 64A' pulls the rear wheel 60' in a clockwise direction and back to the center position shown in FIG. 3A.

In one embodiment, the front and rear wheel springs are coupled with the respective front and rear wheels for normally urging the wheels back to a center or neutral position, which is shown in FIG. 3A. Thus, the wheels are self-centering and will return back to the center position when the scooter is upright and is not leaned to the left (FIG. 3B) or the right (FIG. 3C).

Referring to FIG. 4, in one embodiment, a scooter 120 includes a front cross piece 162 having a pair of front wheel springs 164A, 164B connected therewith. The first front wheel spring 164A has a leading end 166A connected with the front cross piece 162 and a trailing end 168A connected with a spring mounting flange 170 that is attached to the frame 122. Unlike the embodiment shown and described above in FIGS. 2 and 3A-3C, the scooter frame 122 has only one front wheel spring mounting flange 170 that attaches to both of the first and second front wheel springs 164A, 164B. The second front wheel spring 164B includes a leading end 166B attached to the front cross piece 162 and a rear end 168B that is attached to the single front wheel spring mounting flange 170.

Similarly, the rear end of the frame 122 has a single rear wheel spring mounting flange 170' that is attached to the leading ends of the respective first and second rear wheel springs 164A', 164B'. The first rear wheel spring 164A' has a trailing end 166A' connected with the rear cross piece 162' and a leading end 168A' connected with the single rear wheel spring mounting flange 170'. The second rear wheel spring 164B' has a trailing end 166B' connected with the rear cross piece 162' and a leading end 168B' connected with the single rear wheel spring mounting flange 170'.

Referring to FIG. 5, in one embodiment, a scooter 220 may include a single front wheel spring 264 that normally urges a front wheel 260 back into a center position, and a rear wheel spring 264' that normally urges a rear wheel 260' back into a center position. In one embodiment, the front head set 234 has a tab 262 pivotally mounted therein. The tab 262 is attached to and pivots simultaneously with a front fork that pivotally secures the front wheel to the front head set 234. In one embodiment, the length of the tab may be adjusted to change the physics of operation of the front wheel. The front wheel spring 264 has a leading end 266 that is attached to the tab 262, and a trailing end 268 that is attached to the front wheel spring mounting flange 270, which, in turn, is secured to the underside of frame component 24, as shown in FIG. 1A.

Referring again to FIG. 5, the rear head set 236 has a rear tab 262' that is pivotally mounted thereon. The rear tab 262' is coupled with a rear fork upon which is mounted the rear wheel 160'. The rear tab 262', the rear fork (not shown), and the rear wheel 160' pivot simultaneously with one another and relative to the rear head set 236. The rear spring 264' has a trailing end 266' attached to the rear tab 262', and a leading end 268' that is attached to the rear spring mounting flange 270', which, in turn, is secured to the rear underside of frame component 28, as shown in FIG. 1A.

Referring to FIGS. 6A and 6B, in one embodiment, a scooter 320 has one or more of the features described above in FIGS. 1A-5. In one embodiment, the scooter 320 preferably includes a steering damper assembly 380 having a sliding shaft 382 connected with a rear cross piece 362'. The damper assembly 380 includes a housing that is connected with the horizontally extending rear section 328 of the frame 322 via a mounting ring 384 and a shaft 386. The steering damper assembly 380 preferably controls and dampens rapid pivoting movement of the rear wheel 360' relative to the rear head set 336. For example, if the scooter 320 is moving forward toward the right side of the page in FIGS. 6A and 6B, and the rear wheel 360' strikes an object such as a pebble or rock, the steering damper assembly 380 will prevent rapid pivoting or whipping movement of the rear wheel 360' above a certain rate of rotation so that the rear wheel 360' cannot kick or whip to the side. Thus, the steering damper assembly 380 will allow normal pivoting of the rear wheel 360' but will prevent rapid pivoting or rotation of the rear wheel 360'. The scooter 320 also preferably has first and second rear wheel springs 364A and 364B that normally urge the rear wheel 360' back to the center position shown in FIG. 6B.

Figure 7:
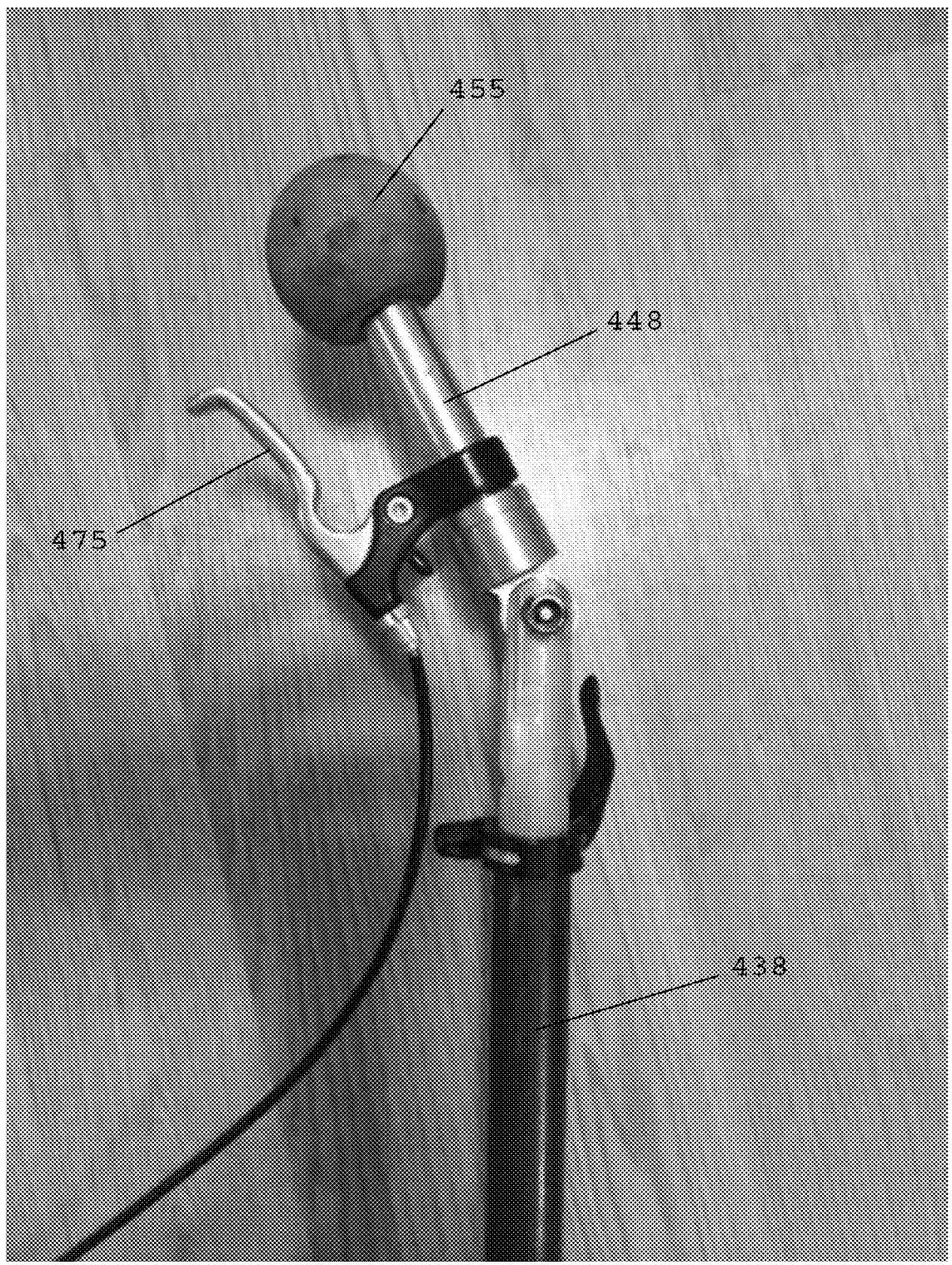
FIG. 7 shows a scooter including a rudder and a handbrake mounted on the rudder, in accordance with one embodiment of the present invention.

Referring to FIG. 7, in one embodiment, a scooter desirably includes a rudder 438 that is fixed to the frame of the scooter, and a handle 448 that is secured to the upper end of the rudder. In one embodiment, the upper end of the handle 448 has a sphere 455 mounted thereon. During operation, a rider may rest his or her hand (e.g., palm) upon the sphere 455 for steering the scooter (e.g., leaning to left or right). In one embodiment, the rudder 438 is grasped by an operator and is used by the operator for leaning the scooter to the left or right for turning the scooter to the left or the right. In one embodiment, the scooter preferably includes a hand brake 475 mounted on the handle 448. In one embodiment, the hand brake 475 is coupled with at least one of the front and rear wheels for braking the scooter.

The steering damper assembly preferably prevents whipping action of the rear wheel that may result from a sudden impact with an object such as when the rear wheel strikes a rock or pebble. The steering damper assembly preferably does not allow whipping action faster than a certain rate of rotation so as to prevent an operator from losing control of the scooter due to the rear wheel rapidly pivoting or rotating when striking an object.

In one embodiment, the front and rear wheels of the scooter are connected with spring elements that normally urge the front and rear wheels to a self-centering or neutral position (e.g., when the scooter is moving along a straight path). In addition to the front and rear springs shown and described herein, other scooter embodiments may include coil springs provided in the respective front and rear head sets.

In one embodiment, the front and rear head sets are angled inwardly toward one another, which facilitates the self-centering action on the front and rear wheels. In one embodiment, the front and rear head sets may extend along angles that are more acute relative to the horizontally extending front and rear sections of the scooter frame, which provides more self-centering action on the front and rear wheels.

In one embodiment, the foot platform may be made from an aluminum tube that drapes over the horizontally extending mid-section of the frame and that is adapted for an operator to stand upon. In one embodiment, the foot platform may have lateral edges that drape downwardly toward the road surface and over the sides of the horizontally extending mid-section of the frame, whereby the draping sides define a curved surface having a radius of 10" or more.

In one embodiment, the forks have multiple positions for mounting the front and rear wheels thereto. The different mounting positions enable the front and rear wheels to be mounted at different offset distances relative to the respective longitudinal axes of the front and rear head sets of the scooter. In one embodiment, increasing the offset distances between where the longitudinal axes intersect the plane of the ground and the points at which each respective wheel intersects the plane of the ground serves to increase the ease by which the scooter may be turned, but reduces its stability at high speeds. Conversely, decreasing the offset distances between where the longitudinal axes intersect the plane of the ground and the points at which each respective wheel intersects the plane of the ground serves to decrease the ease by which the scooter may be turned, but increases stability at higher speeds.

In one embodiment, the front and rear head sets are angled inwardly toward one another. Angling the front and rear head sets inwardly toward one another enhances the self-centering tendency of the wheels, thus tending to compel the wheels to stay aligned with the longitudinal axis of the scooter frame.

In one embodiment, the front and rear wheels are made of hard plastic such as polyurethane or another hard polymer material. The wheels preferably have rounded apex surfaces that contact the ground for making it easier for the wheels to pivot in their respective headsets as the scooter is leaned to the left and the right.

While the foregoing is directed to embodiments of the present invention, other and further embodiments of the present invention may be devised without departing from the basic scope thereof.

What is claimed is:

1. A scooter comprising:
   a frame having a leading end adjacent the front of said scooter and a trailing end adjacent the rear of said scooter;
   a front wheel mounted adjacent the leading end of said frame;
   a rear wheel mounted adjacent the trailing end of said frame;
   said front wheel being pivotally mounted to a front head set of said scooter frame so as to enable said front wheel to pivot relative to said front head set, wherein said front head set has a longitudinal axis that angles inwardly toward the rear of said scooter so that a lower end of said front head set is closer to the rear of said scooter than an upper end of said front head set;
   said rear wheel being pivotally mounted to a rear head set of said scooter frame so as to enable said rear wheel to pivot relative to said rear head set, wherein said rear head set has a longitudinal axis that angles inwardly toward the front of said scooter so that a lower end of said rear head set is closer to the front of said scooter that an upper end of said rear head set;
   wherein said frame is metal and comprises a horizontally extending front section, a horizontally extending mid-section, and a horizontally extending rear section, a front vertical section extending between a trailing end of said horizontally extending front section and a leading end of said horizontally extending mid-section, and a second vertical section extending between a trailing end of said horizontally extending mid-section and a leading end of said horizontally extending rear section;
   wherein said horizontally extending mid-section lies within a plane that is below said front and rear frame sections, and wherein the plane of said horizontally extending mid-section is at or below a plane extending through the centers of said front and rear wheels so as to enhance the stability of said scooter, and so as to make it easier for a rider to turn said scooter to the left and right;
   a rudder connected to the horizontally extending front section adjacent said front wheel, wherein said front and rear wheels turn independently of said rudder, and said rudder is not directly connected to said front and rear wheels for turning said wheels to the left or right;
   a handle pivotally secured to an upper end of said rudder so that the angle of said handle relative to said rudder may be adjusted and locked in place using a handle locking assembly, wherein the height of said rudder and the distance between said handle and the horizontally extending front section of said frame may be adjusted, and wherein said scooter further comprises a rudder locking assembly for fixing the height of said rudder.

2. The scooter as claimed in claim 1, wherein said rear wheel is mounted on a rear fork, which, in turn, is pivotally connected to a lower end of said rear head set, and wherein said front and rear wheels have road engaging surfaces that are convexly curved to provide peaks that enable said scooter wheels to more easily lean to the left or right when turning said scooter.

3. The scooter as claimed in claim 2, further comprising a front fork connected with a lower end of said front head set, wherein said front wheel is mounted to the lower end of said front head set via said front fork.

4. The scooter as claimed in claim 3, wherein said front fork includes a series of mounting holes that enable said front wheel to be mounted on said front fork at different offset distances relative to the longitudinal axis of said front head set for modifying the performance of said front wheel.

5. The scooter as claimed in claim 4, wherein when said scooter is placed atop a road surface, the longitudinal axis of said front head set intersects the road surface at a first point, and a vertical axis drawn through the center of said front wheel mounted on said front fork intersects the road surface at a second point, and wherein the second point is closer to the rear of said scooter than the first point.

6. The scooter as claimed in claim 5, wherein the horizontal distance between the first point and the second point is the front wheel offset distance for said front wheel.

7. The scooter as claimed in claim 6, wherein said rear fork has a series of openings that enable the rear wheel to be secured to said rear fork at different offset distances relative to the longitudinal axis of said rear head set for modifying the performance of said rear wheel.

8. The scooter as claimed in claim 7, wherein when said scooter is placed atop a road surface, the longitudinal axis of said rear head set intersects the road surface at a third point, and a vertical axis drawn through the center of said rear wheel mounted on said rear fork intersects the road surface at a fourth point, and wherein the third point is closer to the rear of said scooter than the fourth point.

9. The scooter as claimed in claim 8, wherein the horizontal distance between the third point and the fourth point is the rear wheel offset distance for said rear wheel.

10. The scooter as claimed in claim 9, wherein said front and rear wheels are attached to said respective front and rear head sets using castor assemblies, wherein said castor assembly for said front wheel includes said front fork, which is normally oriented to extend toward the rear end of said scooter and said castor assembly for said rear wheel includes said rear fork that is normally oriented toward the leading end of said scooter.

11. The scooter as claimed in claim 10, wherein each of said front and rear wheels is adapted to pivot and/or rotate independently of one another.

12. The scooter as claimed in claim 11, wherein said front wheel is coupled with at least one elastic element that normally urges said front wheel to return to a center position, and wherein said at least one elastic element coupled with said front wheel is stretched if said front wheel pivots to the left or the right.

13. The scooter as claimed in claim 12, wherein said at least one elastic element comprises at least one spring, and wherein said at least one spring pulls said front wheel back to the center position when the pivoting forces are no longer applied to said front wheel.

14. The scooter as claimed in claim 13, wherein said rear wheel is coupled with at least one elastic element that normally urges said rear wheel to return to a center position, wherein said at least one elastic element coupled with said rear wheel is stretched if said rear wheel pivots to the left or the right, and wherein said at least one elastic element coupled with said rear wheel pulls said rear wheel back to the center position when the pivoting forces are no longer applied to said rear wheel.

15. The scooter as claimed in claim 1, further comprising:
a foot platform that is secured atop the horizontally extending mid-section of said frame, wherein said foot platform has a flat top surface or a convex surface having sides that curve down toward the ground.

16. The scooter as claimed in claim 15, further comprising:
a steering damper assembly that is coupled with said rear wheel to prevent said rear wheel from kicking out or pivoting violently when striking an object, said steering damper assembly having one end coupled to said frame of said scooter proximal to said rear wheel and another end coupled with said fork of said rear wheel, wherein said steering damper assembly allows normal turning of said rear wheel to the left and right while preventing excessively fast or violent pivoting of said rear wheel.

17. A scooter comprising:
a frame having a leading end adjacent the front of said scooter and a trailing end adjacent the rear of said scooter;
a front wheel mounted adjacent the leading end of said frame;
a rear wheel mounted adjacent the trailing end of said frame;
said front wheel being pivotally mounted to a front head set of said scooter frame so as to enable said front wheel to pivot relative to said front head set, wherein said front head set has a longitudinal axis that angles inwardly toward the rear of said scooter so that a lower end of said front head set is closer to the rear of said scooter than an upper end of said front head set;
said rear wheel being pivotally mounted to a rear head set of said scooter frame so as to enable said rear wheel to pivot relative to said rear head set; and
a rudder connected to the leading end of said frame, wherein said front and rear wheels turn independently of said rudder, and said rudder is not directly connected to said front and rear wheels for turning said wheels to the left or right.

* * * * *